US012719098B2

(12) United States Patent
Seong et al.

(10) Patent No.: US 12,719,098 B2
(45) Date of Patent: Aug. 25, 2026

(54) METHOD FOR REUSING ACTIVE MATERIAL USING POSITIVE ELECTRODE SCRAP

(71) Applicant: LG ENERGY SOLUTION, LTD., Seoul (KR)

(72) Inventors: Eun-Kyu Seong, Daejeon (KR); Min-Seo Kim, Daejeon (KR); Se-Ho Park, Daejeon (KR); Yong-Sik Seo, Daejeon (KR); Doo-Kyung Yang, Daejeon (KR); Jeong-Bae Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 218 days.

(21) Appl. No.: 18/268,043

(22) PCT Filed: Aug. 1, 2022

(86) PCT No.: PCT/KR2022/011328

§ 371 (c)(1),
(2) Date: Jun. 16, 2023

(87) PCT Pub. No.: WO2023/014023

PCT Pub. Date: Feb. 9, 2023

(65) Prior Publication Data

US 2024/0106020 A1 Mar. 28, 2024

(30) Foreign Application Priority Data

Aug. 2, 2021 (KR) ........................ 10-2021-0101580

(51) Int. Cl.
*H01M 4/00* (2006.01)
*C01G 53/44* (2025.01)
(Continued)

(52) U.S. Cl.
CPC ............ *H01M 10/54* (2013.01); *C01G 53/44* (2013.01); *H01M 4/366* (2013.01); *H01M 4/505* (2013.01);
(Continued)

(58) Field of Classification Search
CPC ................................ H01M 10/00; H01M 4/00
See application file for complete search history.

(56) References Cited

U.S. PATENT DOCUMENTS 5,491,037 A 2/1996 Kawakami
8,616,475 B1 12/2013 Smith et al.
(Continued)

FOREIGN PATENT DOCUMENTS

CN 1585187 A 2/2005
CN 102651490 A 8/2012
(Continued)

OTHER PUBLICATIONS

CN-109546254A, English Translated, (Year: 2019).*
(Continued)

*Primary Examiner* — Gordon Baldwin
*Assistant Examiner* — Mohammad Mayy
(74) *Attorney, Agent, or Firm* — Bryan Cave Leighton Paisner LLP

(57) ABSTRACT

Provided is a method for recovering and reusing an active material from a positive electrode scrap. The method for reusing a positive electrode active material, including the steps of: heat treating a positive electrode scrap including a lithium transition metal composite oxide positive electrode active material layer including nickel, cobalt and manganese or aluminum on a current collector to perform thermal decomposition of the binder and conductive material in the active material layer, thereby separating the current collector from the active material layer and recovering the active
(Continued)

material in the active material layer; performing a first washing of the recovered active material with an aqueous lithium compound solution showing alkalinity in an aqueous solution state; adding a lithium precursor to the washed active material and carrying out annealing; performing a second washing of the annealed active material; and surface coating the washed active material after the second washing step to obtain a reusable active material.

14 Claims, 7 Drawing Sheets

(51) Int. Cl.

| | |
|---|---|
| ***H01M 4/36*** | (2006.01) |
| ***H01M 4/505*** | (2010.01) |
| ***H01M 4/525*** | (2010.01) |
| ***H01M 10/54*** | (2006.01) |
| *H01M 4/02* | (2006.01) |

(52) U.S. Cl.

CPC ......... *H01M 4/525* (2013.01); *C01P 2002/50* (2013.01); *C01P 2004/03* (2013.01); *C01P 2004/52* (2013.01); *C01P 2004/84* (2013.01); *C01P 2006/40* (2013.01); *C01P 2006/80* (2013.01); *H01M 2004/028* (2013.01)

(56) References Cited

U.S. PATENT DOCUMENTS

| | | | | |
|---|---|---|---|---|
| 8,882,007 | B1 | 11/2014 | Smith et al. | |
| 2005/0123834 | A1* | 6/2005 | Noguchi | H01M 10/0525 429/223 |
| 2006/0068289 | A1* | 3/2006 | Paulsen | C01G 51/50 429/231.1 |
| 2013/0316233 | A1* | 11/2013 | Hirayama | H01M 4/1391 429/231.95 |
| 2014/0056797 | A1 | 2/2014 | Kabe et al. | |
| 2018/0212282 | A1* | 7/2018 | Lee | C22B 7/001 |
| 2019/0348723 | A1* | 11/2019 | Müller | C22B 26/12 |

FOREIGN PATENT DOCUMENTS

| | | | | | |
|---|---|---|---|---|---|
| CN | 104577246 | A | | 4/2015 | |
| CN | 105870533 | A | | 8/2016 | |
| CN | 108103323 | A | * | 6/2018 | C22B 21/0069 |
| CN | 109546254 | A | * | 3/2019 | C22B 23/0446 |
| CN | 110842006 | A | | 2/2020 | |
| CN | 110010990 | B | | 12/2020 | |
| JP | 1994-251805 | A | | 9/1994 | |
| JP | 2013-095951 | A | | 5/2013 | |
| JP | 5269222 | B2 | | 8/2013 | |
| JP | 2015-185471 | A | | 10/2015 | |
| JP | 2016-085953 | A | | 5/2016 | |
| JP | 2016-149330 | A | | 8/2016 | |
| JP | 6055761 | B2 | | 12/2016 | |
| JP | 2020-066795 | A | | 4/2020 | |
| KR | 10-0503385 | B1 | | 7/2005 | |
| KR | 10-2016-0088412 | A | | 7/2016 | |
| KR | 10-2017-0033787 | A | | 3/2017 | |
| KR | 10-2017-0076222 | A | | 7/2017 | |
| KR | 10-1992715 | B1 | | 8/2018 | |
| KR | 10-2156796 | B1 | | 9/2020 | |
| WO | 2020-236513 | A1 | | 11/2020 | |

OTHER PUBLICATIONS

CN-108103323-A English Translated, (Year: 2018).*

Li Wangda et al (2020): "High-nickel layered oxide cathodes for lithium-based automotive batteries," Nature Energy, Nature Publishing Group, vol. 5, No. 1, XP036994474, Jan. 1, 2020, pp. 26-34.

Zhao Yanlan et al (2020): "Regeneration and reutilization of cathode materials from spent lithium-ion batteries", Chemical Engineering Journal, ELSEVIER, Amsterdam, NL, vol. 383, XP085971052, 2020, 19 pages.

* cited by examiner

METHOD FOR REUSING ACTIVE MATERIAL USING POSITIVE ELECTRODE SCRAP

CROSS-REFERENCE TO RELATED APPLICATIONS

The present application is a National Phase entry pursuant to 35 U.S.C. § 371 of International Application No. PCT/KR2022/011328, filed on Aug. 1, 2022, and claims the benefit of and priority to Korean Patent Application No. 10-2021-0101580, filed on Aug. 2, 2021 with the Korean Intellectual Property Office, the disclosures of which are incorporated herein by reference in their entirety for all purposes as if fully set forth herein.

TECHNICAL FIELD

The present disclosure relates to a method for recycling resources in manufacturing lithium secondary batteries. Particularly, the present disclosure relates to a method for recovering and reusing positive electrode scraps generated in a process for manufacturing lithium secondary batteries or lithium secondary battery positive electrode materials discarded after use.

BACKGROUND

Rechargeable lithium secondary batteries have been spotlighted as substitutes for fossil energy. Lithium secondary batteries have been used largely for conventional hand-held devices, such as cellular phones, video camera and gearing tools. However, recently, application of lithium secondary batteries tends to be extended gradually to electrically driven vehicles (EV, HEV and PHEV), large capacity energy storage systems (ESSs), uninterruptable power supply (UPS), or the like.

A lithium secondary battery is provided with an electrode assembly including a group of unit cells having a structure in which a positive electrode plate and a negative electrode plate, each including an active material coated on a current collector, are disposed with a separator interposed therebetween, and a casing (i.e. battery casing) configured to receive and seal the electrode assembly together with an electrolyte. The positive electrode active material for a lithium secondary battery mainly uses a lithium-based oxide, while the negative electrode active material uses a carbonaceous material. The lithium-based oxide contains a metal, such as cobalt, nickel or manganese. Particularly, nickel and manganese are expensive valuable metals, and more particularly, cobalt belongs to strategic metals and is given to special attentions about its supply and demand from all the countries of the world. It is known that since the number of cobalt production countries is limited, cobalt is a metal, the supply and demand of which is unstable. When an imbalance in supply and demand of raw materials of strategic metals occurs, it is highly likely that the cost of raw materials is increased.

According to the related art, studies about recovering and recycling such valuable metals from lithium secondary batteries (waste batteries) that are out of service and discarded after use have been conducted largely. More preferred is recovery of resources from waste materials discarded after cutting positive electrode plates, or positive electrodes having defects generated in processing, besides such waste batteries.

Currently, when manufacturing a lithium secondary battery, a positive electrode slurry prepared by mixing a positive electrode active material, a conductive material, a binder and a solvent is coated on an elongated sheet-like positive electrode current collector 10, such as aluminum (Al) foil, to form a positive electrode active material layer 20, thereby providing a positive electrode sheet 30, and then positive electrode plates 40 having a predetermined size are cut, as shown in FIG. 1. The portion remaining after the cutting is discarded as a positive electrode scrap 50. If the positive electrode active material is recovered from the positive electrode scrap 50 and reused, there is a significant advantage in industrial-economic and environmental terms.

According to the related art, most of the methods for recovering a positive electrode active material include dissolving a positive electrode in hydrochloric acid, sulfuric acid, nitric acid, or the like, and extracting the active material elements, such as cobalt, nickel and manganese to be reused as raw materials for preparing a positive electrode active material. However, such a process of extracting active material elements using an acid is not eco-friendly as a process of recovering pure raw materials, and requires a neutralization step and a wastewater treatment step to cause an increase in processing costs undesirably. In addition, there is a disadvantage in that one of the main elements among the positive electrode active material elements, i.e. lithium, cannot be recovered. To solve the disadvantage, there is a need for a method for directly reusing a positive electrode active material, while not dissolving the positive electrode active material and not extracting the active material in the form of elements.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

The present disclosure is designed to solve the problems of the related art, and therefore the present disclosure is directed to providing a method for recovering and reusing an active material from a positive electrode scrap.

In one aspect of the present disclosure, there is provided a method for reusing a positive electrode active material, including the steps of: heat treating a positive electrode scrap including a lithium transition metal composite oxide positive electrode active material layer including nickel, cobalt and manganese or aluminum on a current collector to perform thermal decomposition of the binder and conductive material in the active material layer, thereby separating the current collector from the active material layer and recovering the active material in the active material layer; performing a first washing of the recovered active material with an aqueous lithium compound solution showing alkalinity in an aqueous solution state; adding a lithium precursor to the washed active material and carrying out annealing; performing a second washing of the annealed active material; and surface coating the washed active material after the second washing step to obtain a reusable active material.

The heat treating step may be carried out at 300-650° C. under air or oxygen atmosphere.

The heat treating step may be carried out at 550° C. for 30 minutes at a temperature increasing rate of 5° C./min.

The aqueous lithium compound solution may include more than 0% and 15% or less of a lithium compound, preferably LiOH. The first washing step may be carried out within 1 hour.

The first washing step may be carried out by impregnating the recovered active material with the aqueous lithium compound solution and agitating at the same time.

The lithium precursor may be at least one selected from LiOH, $Li_2CO_3$, $LiNO_3$ or $Li_2O$.

The lithium precursor may be added to the washed active material in an amount corresponding to a lost lithium as compared to a ratio of lithium to the other metals in an original active material used for the active material layer.

For example, the lithium precursor may be added in an amount of lithium corresponding to a molar ratio of 0.001 to 0.4.

In addition, the lithium precursor may be added preferably in a manner that lithium is further added at a molar ratio of 0.0001 to 0.1 based on a molar ratio of 1:1 of lithium:the other metals.

The annealing may be carried out at 400 to 1000° C. under air or oxygen atmosphere.

The temperature of the annealing step may be a temperature higher than the melting point of the lithium precursor.

The active material in the active material layer may be recovered in the form of powder, and any carbonaceous ingredient produced by carbonization of the binder or conductive material may not remain on the surface.

The surface coating step may be carried out by coating at least one of metals, organometals and carbonaceous ingredients on the surface of the active material through a solid phase process or a liquid phase process, and then carrying out heat treatment at 100 to 1200° C.

The nickel content may be 60 mol % or higher based on the total number of moles of the transition metals.

The nickel content may be 80 mol % or higher based on the total number of moles of the transition metals.

The reusable active material may have a fluorine (F) content of 100 ppm or less.

According to an embodiment of the present disclosure, the method may further include a step of mixing the washed active material with a lithium precursor solution and carrying out spray drying, after the first washing step.

According to the present disclosure, waste positive electrode active materials, such as a positive electrode scrap, generated in a process for manufacturing a lithium secondary battery can be recycled in an eco-friendly manner, while not using any acid. The method according to the present disclosure requires no neutralization step or a waste water treatment step, and thus can reduce an environmental issue and save the processing costs.

According to the present disclosure, it is possible to recover positive electrode active materials without any metal element that cannot be recovered. In addition, a current collector may be recovered, since the current collector is not dissolved. The method according to the present disclosure is not a method for extracting active material elements so that they may be used again as starting materials for preparing positive electrode active materials, but a method which allows direct reusing of the active material recovered in the form of powder, and thus is cost-efficient.

According to the present disclosure, the method uses no solvent at risk of explosion, such as NMP, DMC, acetone or methanol, and thus shows high safety. In addition, the method uses simple processes, such as heat treatment, washing and annealing, and thus allows easy management of the process and is suitable for mass production.

According to the present disclosure, the recovered active material undergoes no degradation of electrochemical performance, and can realize excellent resistance characteristics and capacity characteristics.

Particularly, the method according to the present disclosure can be applied effectively to a method for reusing a Ni-rich positive electrode active material, and can recover or improve the characteristics of the recycled active material to a level of 99% or more based on a fresh active material that has never been used.

BRIEF DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Figure 1:
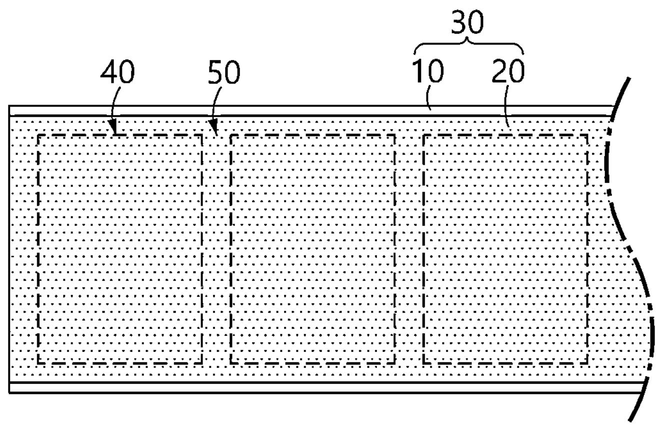
FIG. 1 is a schematic view illustrating a positive electrode scrap discarded after cutting positive electrode plates from a positive electrode sheet.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the following description, the present disclosure will be explained with reference to the accompanying drawings. The embodiments in the detailed description, drawings and claims are provided for non-limiting purposes. Other embodiments and modifications may be made without departing from the scope of the present disclosure. In addition, the embodiments of the present disclosure described hereinafter and depicted in the drawings may be arranged, changed, combined, separated and designed with different constructions, and it is to be noted that such different embodiments are considered herein.

Unless otherwise stated, all of the technical and scientific terms used herein generally have the same meanings as understood commonly by those skilled in the art.

It should be understood that the scope of the present disclosure is not limited to the detailed description and specific examples, since various changes and modifications may be made within the scope of the disclosure. In addition, functional equivalents within the scope of the present disclosure will be apparent to those skilled in the art from the detailed description. Such changes and modifications fall within the scope of the present disclosure. The scope of the present disclosure is defined by the claims together with the whole range of qualified equivalents thereof. It should be understood that the present disclosure is not limited to any specific embodiments that may be changed. The terminology used herein is for the purpose of describing particular embodiments only and is not intended to be limiting of the present disclosure.

The conventional process for recycling an active material is essentially based on extracting valuable metals (nickel, cobalt, manganese, etc.) in the lithium secondary battery active material, degraded in terms of performance after use, in the form of elements, and resynthesizing an active material. However, the present disclosure is differentiated from the conventional process in that the active material is recovered also from the positive electrode scrap generated in a process for manufacturing a lithium secondary battery.

In addition, in the case of the known active material reusing process, chemical methods are added, wherein valuable metals are extracted through the melting using acid/base dissolution or a reductant/oxidant, and the valuable metals are converted into metals (direct reduction process) or resynthesized active materials. However, the present disclosure relates to a method for directly reusing a positive electrode active material, while not dissolving the positive electrode active material.

In order to recycle a positive electrode material directly, it is required to remove a current collector from a positive electrode. The methods for removing a current collector from a positive electrode may include removing a binder through high-temperature heat treatment, dissolving a binder by using a solvent, melting a current collector completely, sorting an active material through dry pulverization and sieving, or the like.

In the method for dissolving a binder by using a solvent, the stability of the solvent is important. Although NMP is the most efficient solvent, it has disadvantages of toxicity and high cost. There is an additional disadvantage in that a solvent recovery step including retreating the waste solvent may be required. The method for melting a current collector completely requires a lower processing cost as compared to the use of a solvent. However, in this case, foreign materials on the recycled active material surface cannot be removed with ease, and hydrogen gas is generated during the removal of the current collector to cause a risk of explosion. In addition, it is difficult to separate a current collector and an active material perfectly, when using dry pulverization and sieving. During the pulverization, the active material undergoes a change in particle size distribution, and the binder is removed hardly. Therefore, there is a disadvantage of degradation of the characteristics of a battery using the active material recycled in this manner.

According to the present disclosure, high-temperature heat treatment is used to separate the active material from the current collector. High-temperature heat treatment is beneficial to mass production and commercialization. However, any foreign materials should not remain on the surface of the recycled active material. According to the present disclosure, even a step of removing the foreign material on the recycled active material surface is suggested.

Figure 2:
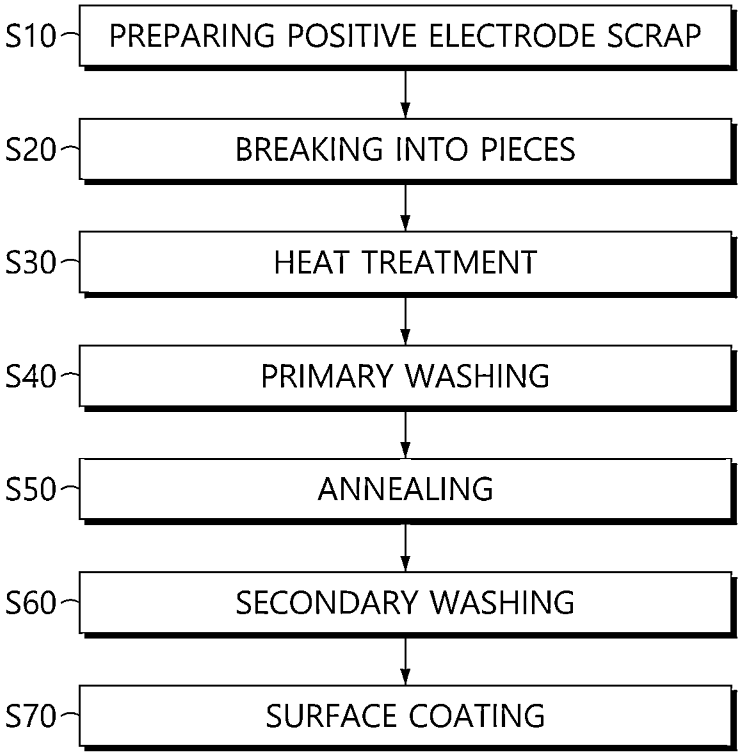
FIG. 2 is a flow chart of the method for reusing an active material according to an embodiment of the present disclosure.

Hereinafter, the method for reusing an active material according to an embodiment of the present disclosure will be explained with reference to FIG. 2. FIG. 2 is a flow chart illustrating the method for reusing an active material according to an embodiment of the present disclosure.

Referring to FIG. 2, a positive electrode scrap to be discarded is prepared, first (step S10).

As shown in FIG. 1, the positive electrode scrap may be a portion remaining after cutting positive electrodes from a positive electrode sheet including a positive electrode active material layer on a current collector. In addition, positive electrodes causing defects during the manufacturing processes may be collected to provide positive electrode scraps. Further, positive electrodes may be separated from lithium secondary batteries discarded after use to provide positive electrode scraps.

For example, N-methyl pyrrolidone (NMP) is added to an active material which is a lithium transition metal composite oxide including nickel (Ni), cobalt (Co) and manganese (Mn) or aluminum (Al) (also referred to as 'NCM-based, NCA-based or NCMA-based lithium transition metal composite oxide, hereinafter'), carbon material as a carbonaceous conductive material and polyvinylidene fluoride (PVDF) as a binder, followed by mixing, to prepare a slurry, the slurry is coated on a sheet-like current collector made of aluminum foil, and then the resultant structure is dried in a vacuum oven at about 120° C. to obtain a positive electrode sheet. Then, positive electrode plates having a predetermined size are cut from the positive electrode sheet, and the remaining positive electrode scrap is prepared.

Particularly, the present disclosure may be applied effectively to a method for reusing a Ni-rich positive electrode active material. For example, the nickel content may be 60 mol % or more based on the total number of moles of the transition metals. In addition, the nickel content may be 80 mol % or more based on the total number of moles of the transition metals.

As a positive electrode active material for a lithium secondary battery, a lithium transition metal composite oxide has been used. Particularly, lithium cobalt oxide of $LiCoO_2$, lithium manganese oxide (e.g. $LiMnO_2$ or $LiMn_2O_4$), lithium iron phosphate (e.g. $LiFePO_4$) or lithium nickel oxide (e.g. $LiNiO_2$) has been used frequently. In addition, in order to improve low heat stability of $LiNiO_2$, while maintaining its excellent reversible capacity, there have been used nickel manganese-based lithium transition metal composite oxide in which nickel is partially substituted with manganese having excellent thermal stability, NCM-based lithium transition metal composite oxide in which nickel is partially substituted with manganese and cobalt, NCA-based lithium transition metal composite oxide in which nickel is partially substituted with cobalt and aluminum, and NCMA-based lithium transition metal composite oxide in which nickel is partially substituted with cobalt, manganese and aluminum.

Thus, the positive electrode scrap has an active material layer on a current collector made of metal foil, such as aluminum foil. The active material layer is formed by coating a slurry prepared by mixing an active material, a conductive material, a binder and a solvent, and has a structure in which the binder interconnects the active material with the conductive material after the evaporation of the solvent. Therefore, if the binder is removed, the active material can be separated from the current collector.

Next, the positive electrode scrap is broken into pieces of a suitable size (step S20). The breaking refers to cutting or shredding the positive electrode scrap so that it may be broken into pieces having a suitable size capable of easy handling. Once the positive electrode scrap is broken into pieces, the positive electrode scrap may be divided finely into a size of 1 cm×1 cm, for example. To carry out the breaking, various dry pulverization instruments, such as a hand-mill, a pin-mill, a disc-mill, a cutting-mill and a hammer-mill, may be used, or a high-speed cutter may be used.

The breaking may be carried out considering the handling of the positive electrode scrap and the properties required in the systems to be used in the subsequent steps. For example, when using a system requiring loading/unloading of the positive electrode scrap and continuous treatment, it is required for the positive electrode scrap to have high flowability, and thus an excessively large positive electrode scrap should be broken into pieces. When the positive electrode scrap has a suitable size, the breaking (step S20) may be omitted.

Referring to FIG. 2, the positive electrode plate is heat treated (step S30).

The heat treatment according to the present disclosure is carried out in order to thermally decompose the binder in the active material layer. The heat treatment may be carried out at 300-650° C., and thus may also be referred to as high-temperature heat treatment. At a temperature of lower than 300° C., the binder is removed hardly, and thus the current collector cannot be isolated, undesirably. At a temperature of higher than 650° C., the current collector is molten (melting point of Al: 660° C.), and thus the current collector cannot be separated.

The heat treatment is maintained for such a time that the binder may be thermally decomposed sufficiently. For example, the heat treatment time may be about 30 minutes, preferably 30 minutes or more. As the heat treatment time is increased, the time during which the binder is thermally decomposed is increased. However, if it is more than a certain time, there is no difference in the thermal decomposition effect. Preferably, the heat treatment time may be 30 minutes to 5 hours.

The heat treatment system may include various shapes of furnaces. For example, the heat treatment system may be a box-type furnace, or a rotary kiln capable of continuous treatment, considering the productivity.

After the heat treatment, cooling may be carried out gradually or rapidly in the air.

For example, the heat treatment may be carried out at a temperature of 550° C. for 30 minutes at a temperature increasing rate of 5° C./min. For example, the temperature increasing rate may be realized with no problem, while accomplishing heating without generating thermal impact to the positive electrode scrap. The heat treatment temperature, 550° C., is one considering the melting point of the Al current collector and allows smooth thermal decomposition of the binder. At this temperature, when carrying out heat treatment for a time of less than 10 minutes, thermal decomposition occurs insufficiently, and thus heat treatment should be carried out for 10 minutes or more, preferably 30 minutes or more.

While the binder and the conductive material in the active material layer are thermally decomposed through the heat treatment, they are converted into $CO_2$ and $H_2O$ and then removed. Since the binder is removed, the active material is separated from the current collector, and the active material to be recovered may be sorted in the form of powder. Therefore, it is possible to separate the current collector from the active material layer and to recover the active material in the active material layer merely by carrying out step S30.

The heat treatment of step S30 may be carried out in the air or under oxygen atmosphere. When carrying out heat treatment under reductant gas or inert gas atmosphere, the binder and the conductive material are not thermally decomposed but carbonized merely. When carbonization is carried out merely, carbonaceous ingredients may remain on the surface of the active material to cause degradation of the performance of the recycled active material. When carrying out heat treatment in the air, the carbon materials in the binder or the conductive material react with oxygen and are removed in the form of CO and $CO_2$ gases through combustion, and thus substantially all of the binder and the conductive material are removed with no residue. Therefore, according to the present disclosure, the active material is recovered in the form of powder, and any carbonaceous ingredient formed by the carbonization of the binder or the conductive material may not remain.

When a Ni-rich positive electrode active material is to be recycled, heat treatment may be carried out under oxygen atmosphere for the purpose of Ni stability. In this case, $O_2$ having a purity of 80% or more, preferably 90% or more, may be used.

Then, the recovered active material is washed primarily (step S40). In the primary washing step, it is important to carry out washing with an aqueous lithium compound solution showing alkalinity in an aqueous solution state. Such an aqueous lithium compound solution is prepared in such a manner that it may contain a lithium compound in an amount of larger than 0% and equal to or less than 15%, and preferably uses LiOH. The amount of LiOH is 15% or less, preferably. Use of an excessive amount of LiOH may remain excessive LiOH on the surface of the active material after washing, thereby adversely affecting the subsequent annealing step. To clean the active material surface to the highest degree before the annealing step, addition of an excessive amount of LiOH is not preferred in terms of process, and thus the amount of LiOH is limited to 15% or less.

The primary washing step may be carried out by dipping the recovered active material in the aqueous lithium compound solution. The recovered active material may be washed within one week, preferably within one day of the dipping. When the recovered active material is washed after the lapse of 1 week or more, lithium may be eluted out excessively to cause degradation of capacity. Therefore, the dipping may be carried out preferably within 1 hour. The primary washing step includes dipping the recovered active material in an aqueous lithium compound solution showing alkalinity in an aqueous solution state, and carrying out agitation, while the recovered active material is dipped. Agitation is also carried out preferably. When the recovered active material is merely dipped in the aqueous lithium compound solution with no agitation, the washing step may be performed slowly to cause lithium elution. When carrying out agitation in combination, the processing time may be minimized Therefore, it is preferred to carry out agitation, while the recovered active material is dipped in the aqueous lithium compound solution.

After the primary washing step, filtering and drying in a convection type oven and in the air may be further carried out.

The reason why the recovered active material is washed primarily with an aqueous lithium compound solution showing alkalinity in an aqueous solution state is to remove LiF and metal fluorides that may be present on the surface of the recovered active material and to carry out surface modification. During the heat treatment in step S30, the binder and the conductive material in the active material layer are vaporized and removed. Herein, $CO_2$ and $H_2O$ may react with lithium on the active material surface to form $Li_2CO_3$ and LiOH, or fluorine (F) present in the binder, such as PVDF, may react with the metal elements forming the positive electrode active material to form LiF or metal fluorides. When LiF or metal fluorides remain, the characteristics of a battery may be degraded when the active material is reused. According to the present disclosure, the step (such as step S40) of primarily washing the recovered active material with an aqueous lithium compound solution showing alkalinity in an aqueous solution state is added to remove the reactants that may be formed on the recycled active material surface, thereby preventing any foreign material from remaining on the recycled active material surface.

In step S40, it is important to carry out washing with the aqueous lithium compound solution showing alkalinity in an aqueous solution state. When using an aqueous sulfuric acid or hydrochloric acid solution is used, not the aqueous lithium compound solution showing alkalinity in an aqueous solution state, F on the active material surface may be washed, but the transition metals (Co, Mg) present in the active material may be eluted out to cause degradation of the performance of the recycled positive electrode active material. According to the present disclosure, the aqueous lithium compound solution showing alkalinity in an aqueous solution state is significantly preferred, since it not only can remove the binder that may remain in a trace amount even after the thermal decomposition of step S30 but also can function to supplement the amount of lithium that may be eluted during the washing, while not causing elution of the transition metals present in the active material.

It is possible to control the content of LiF on the recovered active material surface to less than 500 ppm through step S40, resulting in improvement of capacity. Preferably, the content of F may be controlled to 100 ppm or less, more preferably 30 ppm or less.

After that, a lithium precursor is added to the primarily washed active material, and annealing is carried out (step S50).

While the active material is subjected to the preceding steps, S30 and S40, lithium loss may occur. In step S50, such lithium loss is supplemented.

In addition, in step S50, the crystal structure of the active material is restored through annealing, and thus the characteristics of the recycled active material is restored or improved to the level of a fresh active material that has never been used.

While the active material is subjected to the preceding steps, S30 and S40, a deformed structure may appear on the active material surface. For example, when the active material is a NCM-based lithium transition metal composite oxide, Ni may be converted into rock salt [$NiCO_3 \cdot 2Ni(OH)_2)H_2O$] due to water in step S40, and thus a spinel structure may be formed. When a battery is manufactured by using the active material as it is, the battery may show degraded characteristics, such as a drop in capacity. According to the present disclosure, the crystal structure is restored through step S50. For example, the active material, NCM-based lithium transition metal composite oxide, is restored into a hexagonal structure. Therefore, the initial characteristics may be restored or improved to a level similar to a fresh active material.

The lithium precursor in step S50 may be at least one selected from LiOH, $Li_2CO_3$, $LiNO_3$ and $Li_2O$.

The method for adding a lithium precursor to the primarily washed active material may be drying the washed active material and adding a lithium precursor thereto in a solid phase or a liquid phase. In a variant, the method may be carried out by adding a lithium precursor to the washed active material and performing spray drying so that drying and addition of a lithium precursor may be carried out in a single step. The lithium precursor solution may use a lithium compound capable of being dissolved in an aqueous solution or an organic solvent.

If the washed active material is dried directly in an oven, or the like, after carrying out surface modification by the primary washing step, the active material particles may be aggregated to form lumps. Therefore, grinding may be required to incorporate a lithium precursor to the aggregated particles, or a powder mixing or milling process may be required to incorporate a solid-phase lithium precursor. In this case, the process may become complicated, and it is difficult to perform a continuous process. In addition, particularly in the case of a NCM-based positive electrode active material, mixing a powder with a lithium precursor or milling carried out in the presence of water may cause severe aggregation due to the impregnation of the positive electrode active material with water. Therefore, when the primarily washed active material is mixed with and dispersed in a lithium precursor solution and then spray dried, it is possible to solve the particle aggregation caused by drying and inconvenience of mixing with a solid-phase lithium precursor. In other words, spray drying has an advantage in that it provides the active material in the form of powder, not lumps.

Upon the spray drying, the lithium precursor ingredient is coated or contacted on the active material surface, while the lithium precursor solution is dried right after the spraying. Herein, while the lithium precursor solution functioning as a solvent is dried, the particles are aggregated by the capillary force, thereby providing an advantage in that the particle size is controlled. In the case of a positive electrode scrap converted into an electrode, the particles present on the surface may be pressurized, cracked or broken due to a pressing step. Particularly, the NCM-based active material is more likely to be split due to pressing during the formation of an electrode, as compared to LCO, and thus causes a problem in that the recovered active material includes a larger amount of smaller particles as compared to a fresh active material, resulting in non-uniformity of particles.

In addition, the NCM-based active material used frequently includes large particles formed as secondary particles by aggregation of primary particles having a particle size of several tens to several hundreds of nanometers. In the positive electrode obtained by using such an active material, the secondary particles may be split during the pressing step for controlling the porosity of the electrode to be converted into primary particles or smaller particles having a size of larger than the primary particles but smaller than the larger particles. As the number of particles split by pressing is increased, the active material has an increased specific surface area. Therefore, in the case of a recycled active material obtained from the pressed electrode, some problems affecting the physical properties of slurry, electrode adhesion and electrode performance may occur, when the active material is reused.

In order to make the recycled active material be in a reusable level, it preferably has a particle size distribution not different from the particle size distribution of a fresh active material. The spray drying suggested according to an embodiment of the present disclosure may allow aggregation of smaller particles formed by splitting during the pressing and restoration thereof into larger particles. Therefore, it is possible to solve the problem of non-uniformity of particles and to make the particle size of the recycled active material close to the initial characteristics of a fresh active material. Particularly, this effect is significant in the case of the NCM-based active material undergoing severe splitting in the preceding pressing step. Therefore, it is expected that a battery using the active material recovered according to the method of the present disclosure shows characteristics similar to the characteristics of a battery using a fresh active material.

As described above, the lithium precursor is coated on the active material surface and the active material has a controlled particle size through the spray drying step. Since lithium precursor addition, particle formation and drying are performed in a single step, the overall process is simplified. In addition, there is a special point in that spray drying is not a means for simply acquiring the active material but a means for carrying out larger particle formation of smaller particles used already and split due to the preceding pressing step.

In addition, such washing and spray drying are performed simply by mixing/dispersing the active material particles washed in the preceding step with/in a predetermined concentration of lithium precursor solution, and thus there is an advantage in that the method according to the present disclosure allows a continuous process. Therefore, the method for reusing an active material according to an embodiment of the present disclosure includes a continuous process, and lithium precursor coating, drying and particle formation (particle reregulation) are carried out at the same time in a single step.

The lithium precursor may be added in such an amount that the ratio of lost lithium as compared to the ratio of lithium to the other metals in the original active material (i.e. fresh active material) used for the active material layer may be supplemented. For example, the lithium precursor may be added in an amount of lithium corresponding to a molar ratio of 0.001-0.4, suitably 0.01-0.2, when the ratio of lithium to the other metals in the fresh active material is 1. Addition of an excessive amount of lithium precursor exceeding the amount of lithium lost through washing, or the like, leaves unreacted lithium precursor in the recycled active material, which functions to increase the resistance during the reuse of the active material. Therefore, it is required to introduce a suitable amount of lithium precursor.

In addition, the lithium precursor may be added preferably in such a manner that lithium may be further added at a molar ratio of 0.0001-0.1 based on a molar ratio of 1:1 of lithium:the other metals. The reason why such an excessive amount of lithium is added is for forming a surface protective layer on the active material through surface coating, as described hereinafter. When a secondary battery is manufactured by using the active material, it is possible to maintain life characteristics, while inhibiting side reactions caused by an electrolyte.

The annealing may be carried out at 400-1000° C. under air or oxygen atmosphere. When a Ni-rich positive electrode active material is to be recycled, the annealing may be carried out preferably under oxygen atmosphere for the purpose of Ni stability. In this case, $O_2$ having a purity of 80% or more, preferably 90% or more, may be used.

The temperature of the annealing step may be a temperature higher than the melting point of the lithium precursor. The annealing temperature may be 600-900° C. The annealing temperature should be varied within a limited range depending on the particular type of the lithium precursor. The annealing time may be 1 hour or more, preferably about 5 hours. When a long annealing time is used, the crystal structure may be restored sufficiently, but annealing carried out for an undesirably long time does not significantly affect the performance. For example, the annealing time may be 15 hours or less. The annealing system may be the same as used in the heat treatment step S30 or a similar one.

For example, when using $Li_2CO_3$ as a lithium precursor, the annealing temperature may be suitably 700-900° C., and more suitably 710-780° C. This is because the melting point of $Li_2CO_3$ is 723° C. Most preferably, the annealing may be carried out at 750° C. in this case. When using LiOH as a lithium precursor, the annealing temperature may be suitably 400-600° C., and more suitably 450-480° C. This is because the melting point of LiOH is 462° C.

The annealing temperature is preferably a temperature higher than the melting point of the lithium precursor. However, at a temperature higher than 1000° C., the positive electrode active material may be thermally decomposed to cause degradation of the performance of the active material. Therefore, the annealing temperature should not exceed 1000° C.

After that, the annealed active material is washed secondarily (step S60).

Since the lithium precursor not participating in the reaction after adding the lithium precursor in step S50 is present on the surface of the active material in the form of LiOH or $Li_2CO_3$, a step of removing residual lithium is required. The secondary washing step may use water (distilled water), preferably. Particularly, lithium impurities, particularly lithium carbonate ($Li_2CO_3$) impurities remain on the surface more easily, as the Ni content is increased, and such impurities may react with an electrolyte to cause degradation of the performance of a battery and generation of gases. Therefore, strict management is required in this case. The secondary washing step is effective for removing such residual lithium compounds, and thus the method according to the present disclosure is particularly suitable for a method for reusing a Ni-rich positive electrode active material.

Then, the secondarily washed active material is subjected to surface coating (step S70). After drying the active material washed with water, surface coating is carried out finally to restore the capacity of the recycled active material. It is possible to obtain a reusable active material through step S70.

The surface coating step may be performed by coating at least one of metals, organometals and carbonaceous ingredients on the surface of the active material through a solid phase or liquid phase process, and carrying out heat treatment at 100-1200° C. When the heat treatment is carried out at a temperature higher than 1200° C., the positive electrode active material may be thermally decomposed to cause degradation of the performance. The surface coating through a solid phase or liquid phase process may use any known method, such as mixing, milling, spray drying or grinding.

A surface protective layer is formed from a heterogeneous metal through the surface coating. When the molar ratio of lithium:the other metals in the positive electrode material is set to 1:1, lithium in the active material may react with the surface coating material, and thus the molar ratio of lithium: the other metals in the positive electrode material is reduced to less than 1:1. In this case, it is not possible to realize capacity to 100%. Therefore, lithium lost in the preceding step S50 is added in an excessive amount to increase the molar ratio of lithium:the other metals in the positive electrode material to 1:1, as well as to allow lithium to be further added at a molar ratio of 0.0001-0.1 based on a molar ratio of 1:1 of lithium:the other metals. As a result, it is possible to form a surface protective layer during the surface coating, while providing a molar ratio of 1:1 of lithium:the other metals.

Particularly, when an oxide of metal, such as B, W or B-W, is coated on the active material, and then heat treatment is carried out, a lithium boroxide layer functioning as a surface protective layer may be formed on the active material surface. Lithium added additionally at a molar ratio of 0.0001-1 in step S50 reacts with the oxide of metal, such as B, W or B-W, in step S70, and the molar ratio of lithium:the other metals in the positive electrode active material is not reduced to less than 1:1. Therefore, the active material causes no degradation of capacity.

The reusable active material may have a content of F of 100 ppm or less. According to the present disclosure, the active material may be recovered with a reduced content of F. Thus, when the active material is reused, it is possible to realize excellent resistance characteristics and capacity characteristics.

Therefore, according to the present disclosure, LiF or metal fluoride is removed in the primary washing step, step S40. The washing and drying step using an aqueous lithium compound solution showing alkalinity in an aqueous solution state is advantageous in that it is safe and cost-efficient, can remove LiF or metal fluoride with no loss of the other elements, prevents elution of transition metals, and can supplement lithium loss that may occur during the process. The annealing step, step S50, is advantageous in that it is safe and cost-efficient and can restore (i.e. improves) the crystal structure, i.e. crystallinity, so that the characteristics of a battery including the recycled active material may be restored. In addition, lithium remaining on the surface after adding a lithium precursor may be removed through the secondary washing step, step S60. Further, it is possible to obtain a recycled active material in a level equivalent or similar to a fresh active material by carrying out the surface coating step, S70.

The reusable active material obtained according to the present disclosure may have a particle size distribution similar to that of a fresh active material, and thus any separate treatment for controlling the particle size may not be required. Since no carbonaceous ingredients generated from the carbonization of a binder or a conductive material remain on the surface, there is no need for a step of removing such carbonaceous ingredients. In addition, according to the present disclosure, the method may be applied effectively to a method for reusing a Ni-rich positive electrode active material, and may restore or improve the characteristics of the recycled active material to a level of 99% or more based on a fresh active material that has never been used. Therefore, the active material obtained through the method as shown in FIG. 2 may be used again, as it is, with no additional treatment for manufacturing a positive electrode.

The method according to the present disclosure is suitable for reusing of NCM-based, NCA-based and NCMA-based lithium transition metal composite oxide active materials. The recycled active material obtained according to the present disclosure may be used as it is to 100% with no compositional modification, or may be mixed with a fresh active material and further with a conductive material, a binder and a solvent to prepare and use a slurry.

Mode for Disclosure

Hereinafter, the present disclosure will be explained with reference to Example.

Test Example

Positive electrode active material samples were prepared under the following conditions or by the following methods.

Sample 1: A fresh active material of NCM-based lithium transition metal composite oxide.

Sample 2: A positive electrode active material free from a binder and a conductive material and separated from a current collector through a current collector separation process by carrying out the steps of S10, S20 and S30 according to the method for reusing a positive electrode active material of the present disclosure. The heat treatment in step S30 was carried out under the conditions of 550° C./0.5 hr, a temperature increasing rate of 5° C./min and an air flow of 3 L/min.

Sample 3: An active material of Sample 2 subjected to primary washing by carrying out the step of S40 according to the method for reusing a positive electrode active material of the present disclosure. The primary washing was carried out twice. In the first run, agitation was carried out under 300 rpm for 10 minutes with a ratio of active material:washing solution of 1:30, and only the active material was extracted by using a filter under reduced pressure. In the second run, washing was carried out with a ratio of active material: washing solution of 1:10. The primary washing was carried out to remove LiF remaining on the active material surface.

Sample 4 (corresponding to an embodiment of the present disclosure by carrying out all of the steps included in the method of the present disclosure):Sample 3 was dried, 0.11 mol of LiOH as a lithium precursor was added thereto, and the resultant product was supplied under the conditions of 750° C./5 hr and $O_2$ flow of 3 L/min in order to carry out annealing of step S50 of the method for reusing a positive electrode active material according to the present disclosure. Then, step S60 of washing the resultant product with water was carried out to remove lithium remaining on the surface. The washing with water was carried out by performing agitation at 300 rpm for 1 minute with a ratio of active material:washing solution of 1:1, followed by filtration under reduced pressure and vacuum drying (130° C. drying) overnight. Then, step S70 of adding 1000 ppm of $H_3BO_3$ for the purpose of addition of boron and carrying out coating under the conditions of 300° C./0.5 hr, a temperature increasing rate of 2° C./min and an air flow of 3 L/min was carried out.

Sample 5 (corresponding to an embodiment of the present disclosure): A positive electrode active material recovered in the same manner as Sample 4, except that the amount of lithium precursor added in step S50 was increased to 0.13 mol.

Sample 6 (corresponding to an embodiment of the present disclosure): A positive electrode active material recovered in the same manner as Sample 4, except that the amount of lithium precursor added in step S50 was increased to 0.15 mol.

Sample 7 (corresponding to an embodiment of the present disclosure): A positive electrode active material recovered in the same manner as Sample 4, except that the amount of lithium precursor added in step S50 was increased to 0.17 mol.

Sample 8 (corresponding to Comparative Example, not subjected to the secondary washing step of the present disclosure):Sample 3 was dried, 0.11 mol of LiOH as a lithium precursor was added thereto, and the resultant product was supplied under the conditions of 750° C./5 hr and $O_2$ flow of 3 L/min in order to carry out annealing of step S50 of the method for reusing a positive electrode active material according to the present disclosure. Then, step S70 was carried out in the same manner as Sample 4 with no secondary washing step, i.e. step S60.

Sample 9 (corresponding to Comparative Example): A positive electrode active material recovered in the same manner as Sample 8, except that the amount of lithium precursor added in step S50 was set to 0.13 mol.

Sample 10 (corresponding to Comparative Example): A positive electrode active material recovered in the same manner as Sample 8, except that the amount of lithium precursor added in step S50 was set to 0.15 mol.

The samples were analyzed by inductive coupled plasma (ICP) mass spectrometry to determine residual LiF amount, ratio of lithium to the other metals in the active material and amount of B. After analysis, each sample was identified with the scanning electron microscopic image and particle size. In addition, 96.25 wt % of a positive electrode active material, 1.5 wt % of carbon black as a conductive material and 2.25 wt % of polyvinylidene fluoride (PVDF) as a binder were weighed and mixed with N-methyl pyrrolidone (NMP) to form a slurry. Then, a positive electrode was obtained by using the slurry, and a coin half cell (CHC) was manufactured by using the positive electrode and evaluated in terms of electrochemical performance.

Figure 3:
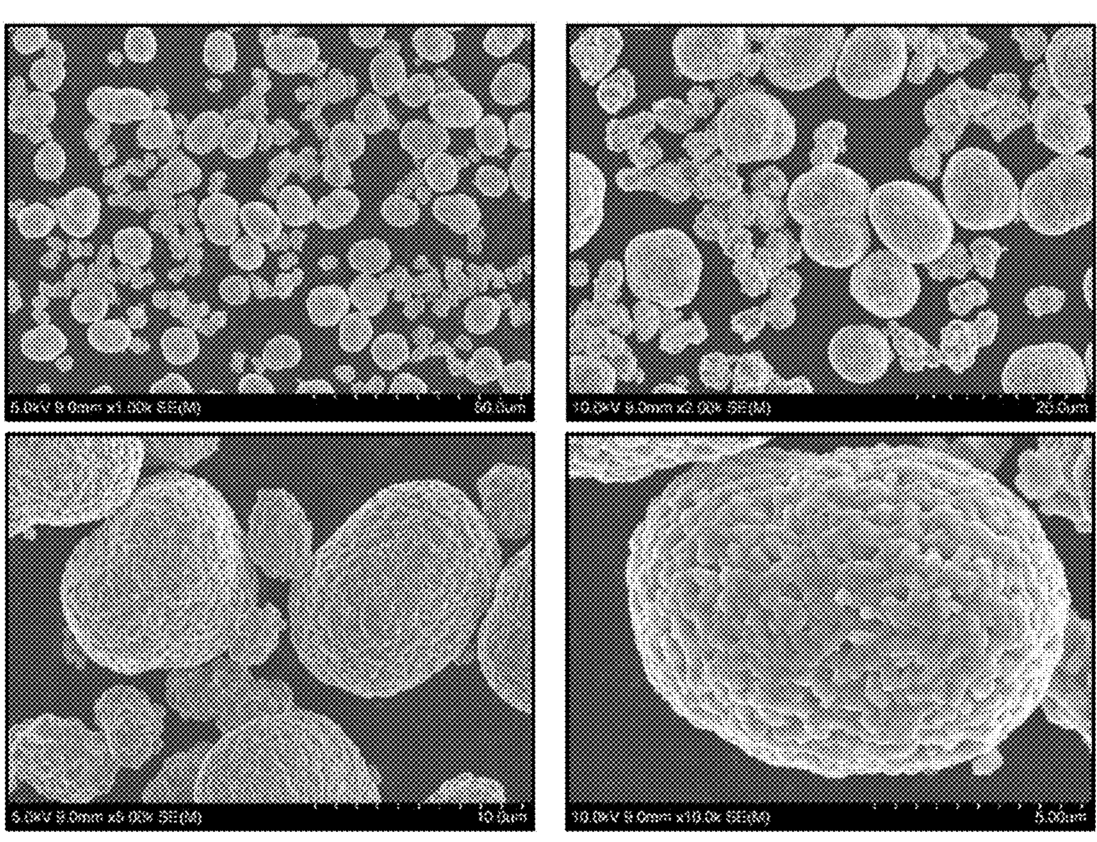
FIGS. 3 and 4 are scanning electron microscopic (SEM) images illustrating Sample 1 which is a fresh active material and Sample 3 subjected to a part of the steps of the method according to the present disclosure.
Figure 4:
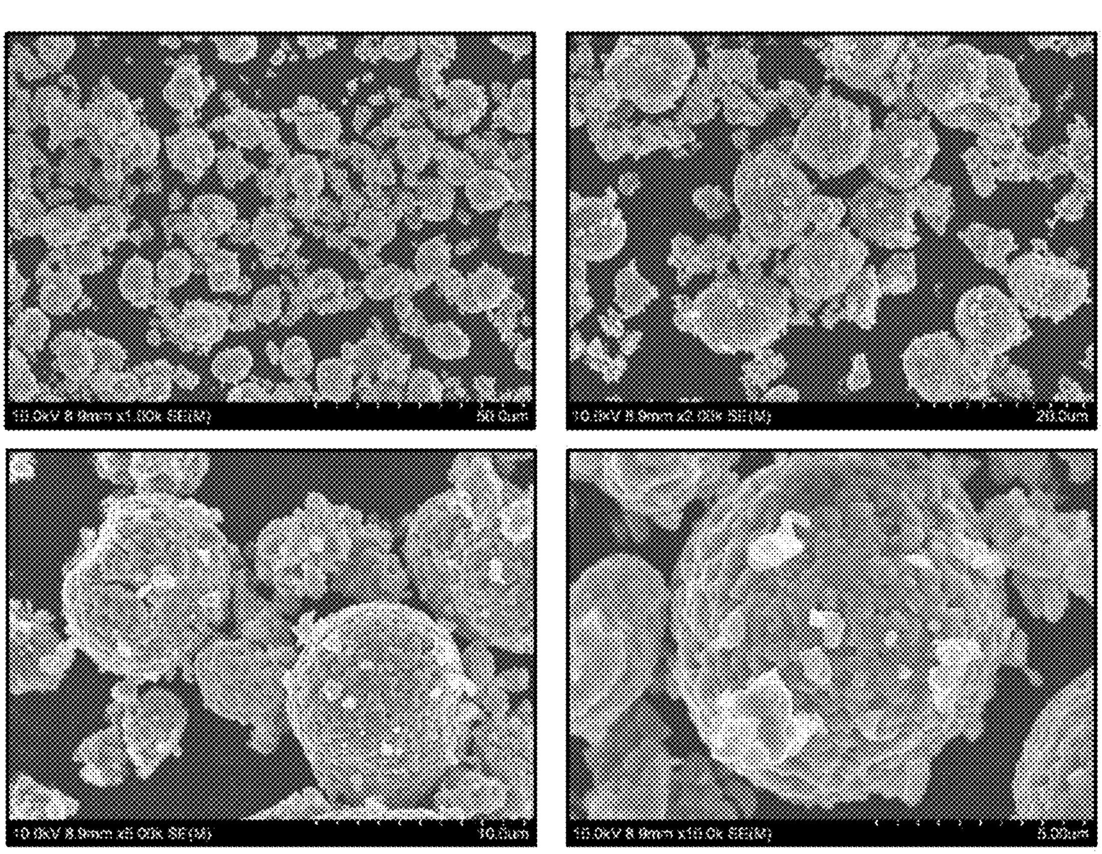

FIGS. 3 and 4 are SEM images illustrating Sample 1 and Sample 3. The SEM images were photographed with a general SEM instrument used frequently in a laboratory. For example, s-4200 available from HITACHI Co. was used to photograph the SEM images. However, there is no difference in the result depending on the instrument or method used for SEM analysis.

FIG. 3 is a SEM image of a fresh active material of Sample 1. FIG. 4 is a SEM image of Sample 3. When comparing FIG. 4 with FIG. 3, smaller particles are split in the case of FIG. 4. Sample 3 is the active material after completing washing through step S40 according to the method for reusing a positive electrode active material of the present disclosure. It can be seen that the active material is split into small particles after washing. The split particles are in contact with larger particles or dispersed therein.

Sample 1, Sample 2 and Sample 3 were analyzed with an ICP detector in terms of the ratio of lithium/the other metals in the active material (Li/Metal Ratio), F content (unit: 10 mg/kg) and B content (unit: mg/kg). The results are shown in the following Table 1.

TABLE 1

| Sample No. | Li/Metal Ratio | F (mg/kg) | B (mg/kg) |
|---|---|---|---|
| Sample 1 | 1.01 | <10 | 1005 |
| Sample 2 | 0.99 | 4975 | 860 |
| Sample 3 | 0.9 | 685 | 55 |

Referring to Table 1, Sample 1 shows a ratio of lithium to the other metals of 1.01, but the ratio is reduced to 0.99 in the case of Sample 2 subjected to the heat treatment of step S30, and is further reduced to 0.9 in the case of Sample 3 subjected to primary washing of step S40 additionally. In other words, it can be seen that lithium is lost after the washing step, etc., and thus such lithium deficiency should be supplemented.

Table 1 shows the values determined by ICP analysis. As mentioned above, ICP analysis has an error of about ±0.02. Therefore, in Comparative Example 1 corresponding to a fresh active material, the ratio of lithium to the other metals is not 1:1. Therefore, the amount of lithium added to supplement the lithium loss is the reduced amount of lithium based on the ratio of lithium to the other metals in the original active material (i.e. fresh active material) used for the active material layer.

Meanwhile, it can be seen that Sample 1 shows a content of F of less than 10 mg/kg, while Sample 2 shows a significantly increased content of F. This is because LiF is produced during the heat treatment of step S30. Sample 3 is further subjected to the primary washing step, as compared to Sample 2. Referring to Table 1, Sample 3 shows a significantly reduced content of F in the recovered positive electrode active material, as compared to Sample 2. In other words, it can be seen that LiF is dissolved in the aqueous lithium compound solution used as a washing solution, and thus is removed, by the primary washing step. Therefore, it can be seen that LiF is removed remarkably by step S40 of the method disclosed herein.

The fresh active material used in this test further includes B in an amount of 1005 mg/kg, as shown in Sample 1. Referring to Sample 2 in Table 1, it shows a content of B reduced as compared to Sample 1. It can be also seen that Sample 3 shows a further reduced content of B after the primary washing step. Therefore, it can be seen that such a deficiency in B should be supplemented in order to obtain a reusable active material to a level equivalent to the fresh active material.

Thus, a specific element (B in this test) may be lost during the process for recovering a reusable active material, depending on the type of the originally used active material. Particularly, because such an element may be removed completely or remain merely in a small amount during the surface modification based on washing, it is likely that perfect restoration of characteristics is difficult. In this case, the surface coating step disclosed herein is carried out preferably. The surface coating step includes coating with B in Test Example. The surface coating may function as a surface protective layer of the positive electrode active material. The surface coating may be a step of supplementing such an insufficient specific element, while restoring the surface protective layer present on the fresh active material. In the case of the fresh active material used in this test, the surface protective layer includes B, and the lithium loss during the process is understood as a ratio of (lithium in the active material itself+lithium in the surface protective layer): the other metals, not lithium in the active material itself:the other metals, which is not 1:1.

Figure 5:
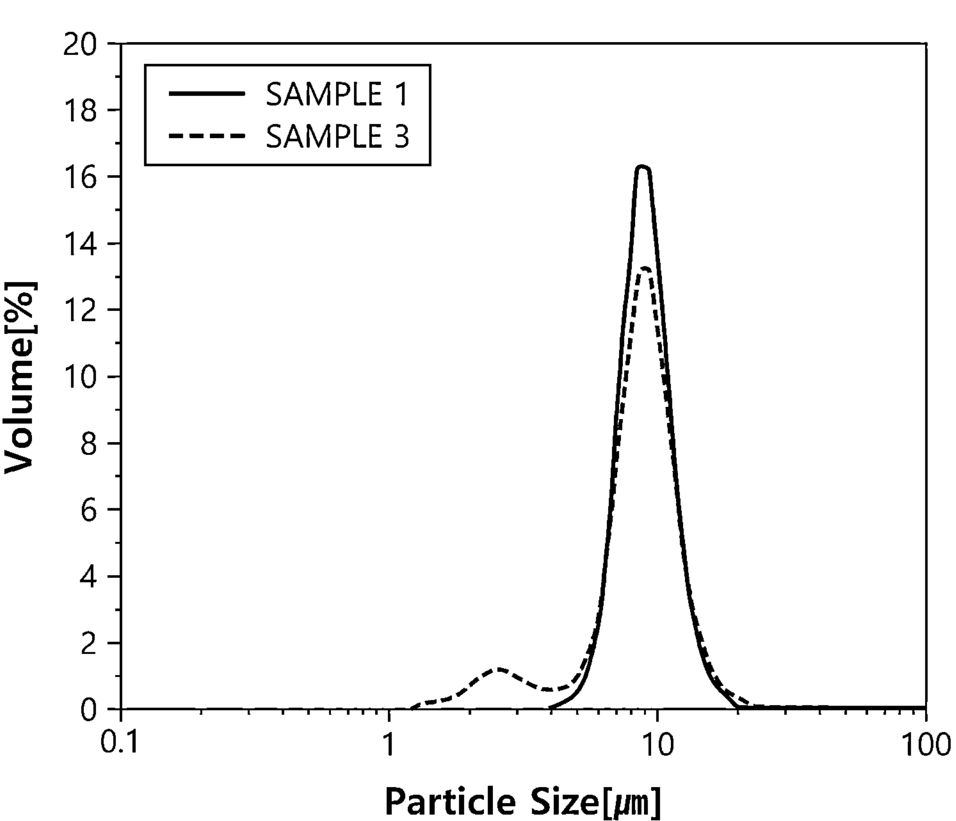
FIGS. 5 and 6 are particle size distribution graphs of the active materials of Sample 1 and Samples 3-6.
Figure 6:
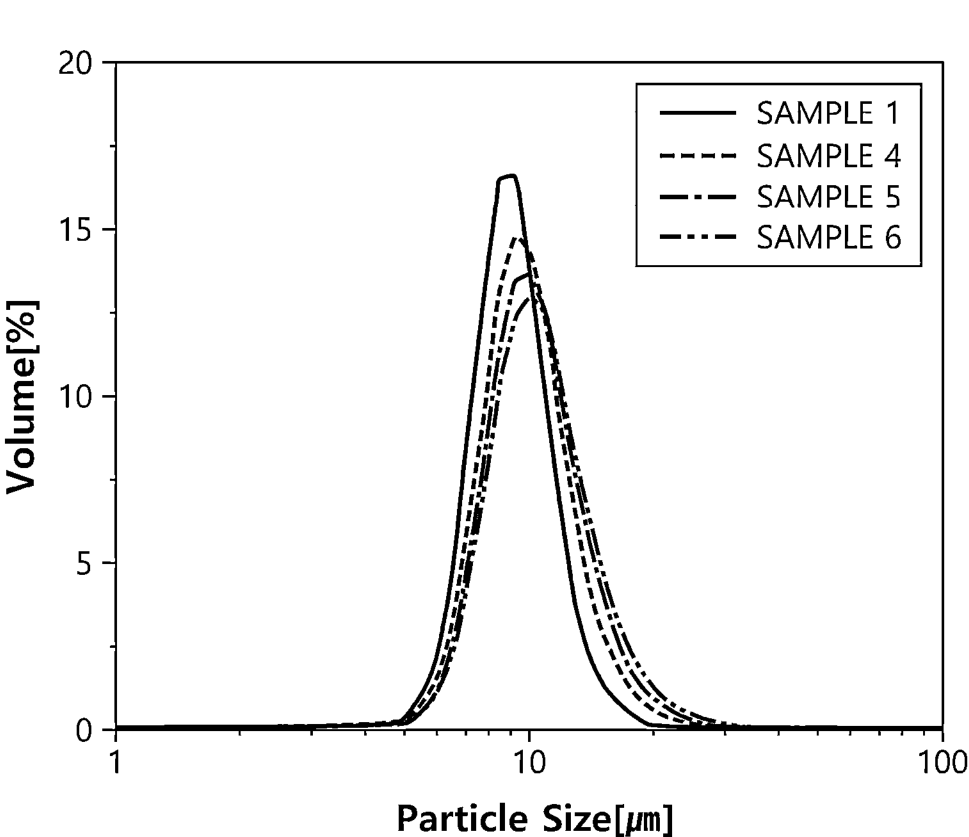

FIGS. 5 and 6 are particle size distribution graphs of the active materials of Sample 1 and Samples 3-6. Particle size distribution may be obtained by using a general particle size analyzer used frequently in laboratories. For example, Horiba LA 950V2 particle size analyzer may be used. However, there is no difference in the result depending on the instrument or method used for particle size determination. In FIGS. 5 and 6, the transvers axis represents particle size (μm), and the vertical axis represents volume %. Table 2 shows D5, D50 and D95 of the particle size distribution as shown in FIG. 5, while Table 3 shows D5, D50 and D95 of the particle size distribution as shown in FIG. 6 (unit: μm). (D* represents the particle diameter at a point corresponding to *% of the distribution ratio of particles).

TABLE 2

| Sample No. | D5 (μm) | D50 (μm) | D95 (μm) |
|---|---|---|---|
| Sample 1 | 6.21 | 8.62 | 12.65 |
| Sample 3 | 2.527 | 8.35 | 13.16 |

TABLE 3

| Sample No. | D5 (μm) | D50 (μm) | D95 (μm) |
|---|---|---|---|
| Sample 1 | 6.21 | 8.62 | 12.65 |
| Sample 4 | 6.45 | 9.3 | 14.61 |
| Sample 5 | 6.57 | 9.68 | 15.87 |
| Sample 6 | 6.64 | 9.97 | 16.87 |

The results of the particle size distribution graph of FIG. 5 coincide with the SEM results of FIGS. 3 and 4. The NCM-based active material shows high particle splitting due to the pressing during the formation of an electrode, and thus it can be seen that Sample 3 subjected to the heat treatment and washing shows formation of a larger amount of small particles in the particle size distribution, as compared to Sample 1. In addition, referring to FIG. 6, Samples 4-6 subjected to annealing (corresponding to Examples of the present disclosure) cause increased particle aggregation, and show a particle size distribution similar to that of Sample 1. Therefore, according to the present disclosure, the particle size distribution of the reusable active material is not changed as compared to that of the fresh active material, and thus the recycled active material substantially maintains the initial characteristics. As a result, it is expected that the battery including the recycled active material provides battery characteristics similar to those of the battery using the fresh active material.

Figure 7:
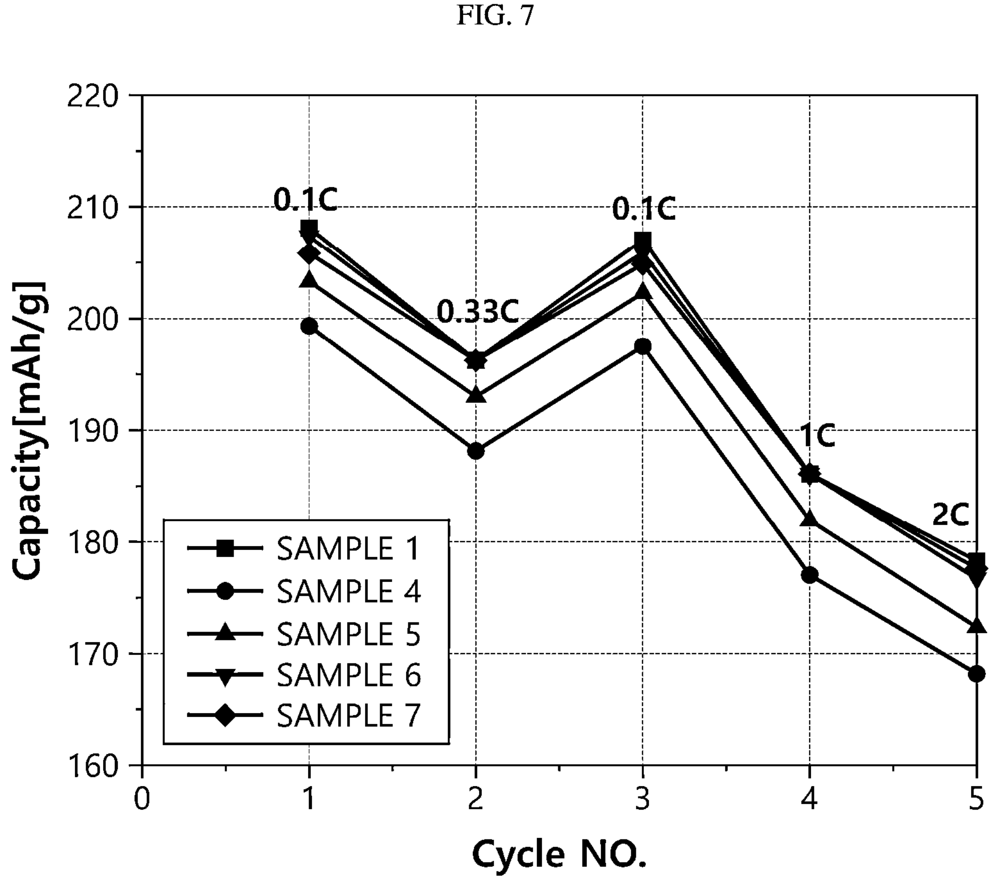
FIGS. 7 and 8 are capacity-cycle number graphs illustrating the results of evaluating cells using sample active materials.
Figure 8:
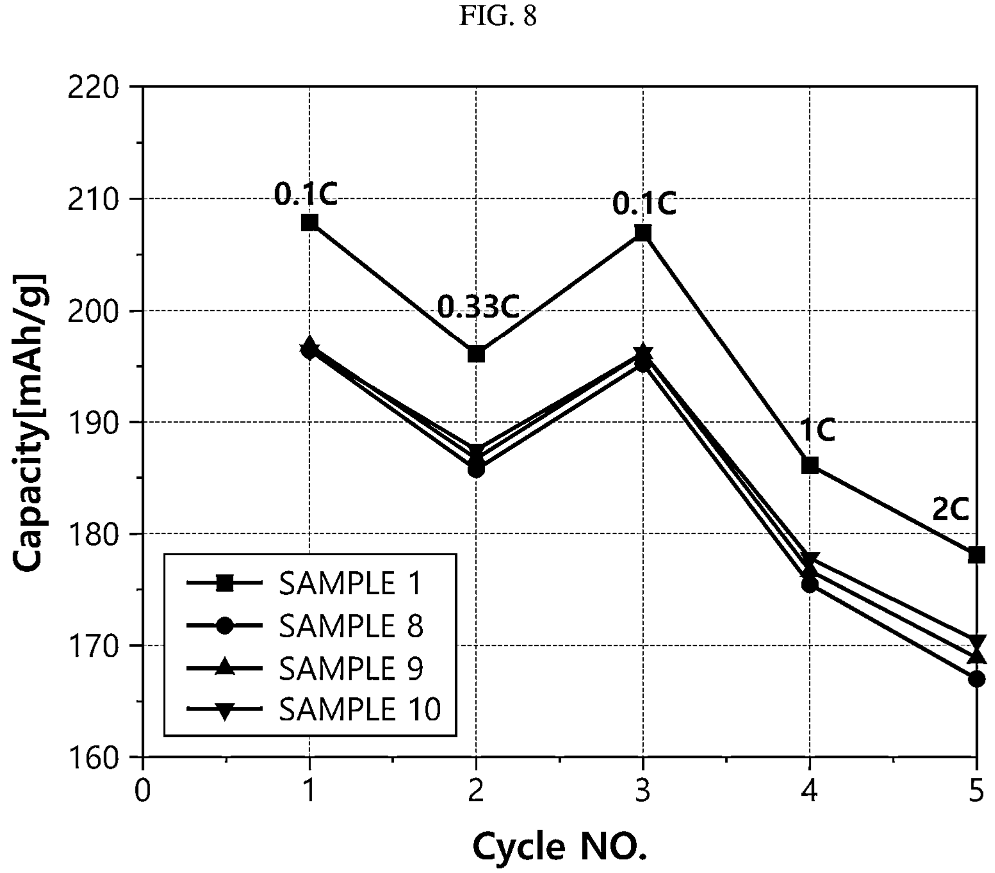

FIGS. 7 and 8 illustrate the results of evaluating cells using sample active materials. The capacity of each cell was evaluated at a different electric current value as a function of cycle repetition number to determine the rate performance. The instrument used for the evaluation is a general charge/discharge testing instrument used frequently in laboratories. There is no difference depending on the device or method used for the test. In the graph of each of FIGS. 7 and 8, the transverse axis represents a cycle number and the vertical axis represents capacity.

The voltage was set to 3-4.3 V, and each cell was charged/discharged under the conditions of 0.1 C/0.1 C-0.33 C/0.33 C-0.5 C/0.1 C-0.5 C/1 C-0.5 C/2 C. The electrolyte used in the cell is based on carbonates including ethylene carbonate (EC) and ethyl methyl carbonate (EMC) at a ratio of 3:7 (EC:EMC) with additives added thereto.

First, referring to FIG. 7, Samples 4-7 according to the present disclosure is compared with Sample 1 (fresh active material). In addition, Table 4 shows the charge capacity, discharge capacity and efficiency of each cell.

TABLE 4

| Sample No. | Charge capacity (mAh/g) | Discharge capacity (mAh/g) | Efficiency (%) |
|---|---|---|---|
| Sample 1 | 228.58 | 207.82 | 90.91 |
| Sample 4 | 225.01 | 199.44 | 88.63 |
| Sample 5 | 226.45 | 203.35 | 89.79 |
| Sample 6 | 228.41 | 207.22 | 90.7 |
| Sample 7 | 227.59 | 205.87 | 90.45 |

Referring to FIG. 7 and Table 4, when the lithium precursor is added, annealing is carried out and the lithium precursor remaining on the surface is removed through secondary washing according to the present disclosure, the recycled active material provides a charge/discharge capacity equivalent to the capacity of the fresh active material. When adding an excessive amount of lithium corresponding to the lithium loss during the process (0.11 mol), the active material realizes a higher capacity (capacity increases in the order of Sample 5→Sample 7 as compared to Sample 4). It can be seen that the C-rate capacity is in a similar level to the fresh active material, besides the initial capacity.

In addition, referring to FIG. 8, Samples 8-10 (corresponding to Comparative Examples) are compared with Sample 1. Samples 8-10 are not subjected to the secondary washing step after annealing. Table 5 shows the charge capacity, discharge capacity and efficiency of each cell.

TABLE 5

| Sample No. | Charge capacity (mAh/g) | Discharge capacity (mAh/g) | Efficiency (%) |
|---|---|---|---|
| Sample 1 | 228.58 | 207.82 | 90.91 |
| Sample 8 | 224.7 | 196.18 | 87.3 |
| Sample 9 | 224.86 | 196.85 | 87.54 |
| Sample 10 | 223.39 | 196.33 | 87.88 |

Referring to FIG. 8 and Table 5, when the lithium precursor remaining on the surface is not removed even though annealing is carried out after the addition of the lithium precursor, the cell shows a lower ratio of capacity realization as compared to the fresh active material. When an excessive amount of lithium corresponding to lithium loss during the process (0.11 mol) is added, there is no significant difference in terms of the initial capacity, but there is a slight increase in the capacity at a high C-rate.

The residual lithium amount was analyzed before and after the lithium precursor remaining on the surface was washed with water. Each of the active materials according to Sample 1, Sample 6, Sample 7 and Sample 10 was taken in an amount of 5 g, dispersed in 100 mL of distilled water, subjected to mixing at 300 rpm for 5 minutes, and then filtered. While the filtrate was titrated with 0.1 M NCl solution, the concentration of each of LiOH and $Li_2CO_3$ dissolved out from the filtrate depending on pH was calculated. When an excessive amount of LiOH is dissolved in the solvent (NMP) during the manufacture of an electrode, it makes the solvent alkaline. The alkalinized solvent is mixed with the binder to cause gelation of slurry, thereby making it impossible to manufacture an electrode. In addition, an excessive amount of $Li_2CO_3$ is attacked and decomposed easily by HF formed from a trace amount of water molecules present in the electrolyte to generate gases. Therefore, the lithium compounds, such as LiOH and $Li_2CO_3$, providing residual lithium should be removed.

TABLE 6

| Sample No. | $Li_2CO_3$ (wt. %) | LiOH (wt. %) | Total (wt. %) |
|---|---|---|---|
| Sample 1 | 0.115 | 0.401 | 0.516 |
| Sample 6 | 0.14 | 0.32 | 0.46 |
| Sample 7 | 0.187 | 0.301 | 0.489 |
| Sample 10 | 0.278 | 0.545 | 0.823 |

When lithium remaining on the surface is not removed, in the case of Sample 10, the total residual lithium content is 0.823 wt % of Li. However, when lithium remaining on the surface is removed, in the case of Samples 6 and 7, the residual lithium content is controlled to a level similar to Sample 1.

As can be seen from the foregoing, it is possible to recover an active material to a directly reusable level from a positive electrode scrap according to the present disclosure. In addition, the method according to the present disclosure does not use any solvent, such as NMP, DMC, acetone or methanol, which is harmful or has a risk of explosion to provide high safety, and includes simple and safe processes, such as heat treatment, washing and drying, annealing, or the like, and thus is amenable to mass production.

In addition, according to the present disclosure, it is possible to recycle a positive electrode scrap by using a simple, eco-friendly and cost-efficient process, and thus even when the resultant lithium transition metal composite oxide positive electrode material is used as it is to manufacture a lithium secondary battery, there is no problem in terms of the battery performance. Particularly, according to the present disclosure, even the secondary washing step is carried out after annealing, and thus the method can be applied effectively to reusing of a Ni-rich positive electrode active material and can recover or improve the characteristics of the recycled active material to a level of 99% or more based on a fresh active material that has never been used.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A method for recycling a positive electrode active material, comprising the steps of:

providing a positive electrode scrap comprising a lithium transition metal composite oxide positive electrode active material layer comprising nickel, cobalt, and manganese or aluminum on a current collector;

separating the current collector from the active material layer and recovering an active material in the active material layer by heat treating the positive electrode scrap to perform a thermal decomposition of a binder and conductive material in the active material layer;

performing a first washing of the recovered active material with an aqueous lithium compound solution showing alkalinity in an aqueous solution state;

adding a lithium precursor to the washed active material and carrying out annealing;

performing a second washing of the annealed active material; and surface coating the washed active material after the second washing step to obtain a recycled active material, wherein the heat treating is carried out at 550-650° C. under air or oxygen atmosphere.

2. The method for recycling a positive electrode active material according to claim 1, wherein the aqueous lithium compound solution comprises more than 0% to 15% or less of a lithium compound, and the first washing step is carried out within 1 hour.

3. The method for recycling a positive electrode active material according to claim 1, wherein the first washing step is carried out by impregnating the recovered active material with the aqueous lithium compound solution and agitating at the same time.

4. The method for recycling a positive electrode active material according to claim 1, wherein the lithium precursor used for the annealing is at least one selected from LiOH, $Li_2CO_3$, $LiNO_3$ or $Li_2O$.

5. The method for recycling a positive electrode active material according to claim 1, wherein the lithium precursor is added to the washed active material in an amount corresponding to a lost lithium as compared to a ratio of lithium to the other metals in an original active material used for the active material layer.

6. The method for recycling a positive electrode active material according to claim 5, wherein the lithium precursor is added in an amount of lithium corresponding to a molar ratio of 0.001 to 0.4.

7. The method for recycling a positive electrode active material according to claim 5, wherein the lithium precursor is added in a manner that lithium is further added at a molar ratio of 0.0001 to 0.1 based on a molar ratio of 1:1 of lithium: the other metals.

8. The method for recycling a positive electrode active material according to claim 1, wherein the annealing is carried out at 400 to 1000° C. under air or oxygen atmosphere.

9. The method for recycling a positive electrode active material according to claim 1, wherein the temperature of the annealing step is a temperature higher than the melting point of the lithium precursor.

10. The method for recycling a positive electrode active material according to claim 1, wherein the active material in the active material layer is recovered in the form of powder, and any carbonaceous ingredient produced by carbonization of the binder or conductive material does not remain on the surface.

11. The method for recycling a positive electrode active material according to claim 1, wherein the surface coating step is carried out by coating at least one of metals, organometals and carbonaceous ingredients on the surface of the active material through a solid phase process or a liquid phase process, and then carrying out heat treatment at 100 to 1200° C.

12. The method for recycling a positive electrode active material according to claim 1, wherein the nickel content is 60 mol % or higher based on the total number of moles of the transition metals.

13. The method for recycling a positive electrode active material according to claim 1, wherein the recycled active material has a fluorine (F) content of 100 ppm or less.

14. The method for recycling a positive electrode active material according to claim 1, further comprising a step of mixing the first washed active material with a lithium precursor solution and carrying out spray drying, after the first washing step.

* * * * *